US012219287B2

(12) United States Patent
Singh

(10) Patent No.: US 12,219,287 B2
(45) Date of Patent: Feb. 4, 2025

(54) SYSTEM AND METHOD FOR DYNAMICALLY CONFIGURING THE OUTPUT OF A DEVICE

(71) Applicant: ARRIS ENTERPRISES LLC, Suwanee, GA (US)

(72) Inventor: Virendra Singh, Bangalore (IN)

(73) Assignee: ARRIS Enterprises LLC, Horsham, PA (US)

( * ) Notice: Subject to any disclaimer, the term of this patent is extended or adjusted under 35 U.S.C. 154(b) by 0 days.

(21) Appl. No.: 17/471,659

(22) Filed: Sep. 10, 2021

(65) Prior Publication Data

US 2022/0103777 A1 Mar. 31, 2022

Related U.S. Application Data

(60) Provisional application No. 63/083,235, filed on Sep. 25, 2020.

(51) Int. Cl.
*H04N 5/50* (2006.01)
*G08C 17/02* (2006.01)
*H04N 21/63* (2011.01)

(52) U.S. Cl.
CPC ............... *H04N 5/50* (2013.01); *G08C 17/02* (2013.01); *H04N 21/63* (2013.01); *G08C 2201/40* (2013.01)

(58) Field of Classification Search
CPC .......... H04N 21/63; H04N 5/50; G08C 17/02; G08C 2201/40
See application file for complete search history.

(56) References Cited

U.S. PATENT DOCUMENTS

| | | | |
|---|---|---|---|
| 2008/0120676 A1* | 5/2008 | Morad | H04N 21/42607 725/127 |
| 2009/0316706 A1* | 12/2009 | Hawley | H04L 12/66 370/401 |
| 2010/0104002 A1* | 4/2010 | Kreiner | H04N 21/43615 375/240.01 |
| 2011/0273625 A1* | 11/2011 | McMahon | H04N 21/2407 348/734 |
| 2013/0212615 A1* | 8/2013 | Schultz | H04N 21/4751 725/25 |
| 2014/0269930 A1* | 9/2014 | Robinson | H04N 21/2365 375/240.24 |
| 2015/0208028 A1* | 7/2015 | Knutson | H04N 21/43615 725/81 |
| 2017/0353731 A1* | 12/2017 | Wade | H04N 7/181 |
| 2018/0376213 A1* | 12/2018 | Walsh | H04N 21/47202 |
| 2019/0335133 A1* | 10/2019 | Sharif-Ahmadi | H04N 21/4325 |
| 2019/0342112 A1* | 11/2019 | Li | H04L 12/281 |

* cited by examiner

*Primary Examiner* — Randy A Flynn
(74) *Attorney, Agent, or Firm* — Panitch Schwarze Belisario & Nadel LLC

(57) ABSTRACT

A system and method for dynamically routing each of multiple independent content streams from a single media gateway appliance to specific output ports. The particular content and the identity of the port or ports to which it will be routed are defined by the contents of user commands received by media gateway appliance. The disclosed technology enables a single appliance to simultaneously route independent content to particular identified displays, thereby providing independent viewing experiences to multiple users.

18 Claims, 3 Drawing Sheets

SYSTEM AND METHOD FOR DYNAMICALLY CONFIGURING THE OUTPUT OF A DEVICE

CROSS-REFERENCE TO RELATED APPLICATION

This application claims the benefit of U.S. Provisional Patent Application No. 63/083,235, filed Sep. 25, 2020, which is incorporated by reference herein in its entirety.

BACKGROUND OF THE INVENTION

The delivery of information and entertainment to consumers via broadband networks continues to expand. Consequently, consumers have come to rely upon a dependable bidirectional connection between their residences and the broadband network provider. For many consumers the primary device providing this connection is a media gateway appliance ("MGA"), such as a set-top box. Typically, such devices offer bidirectional communication with a cable, fiber or satellite multi-service operator ("MSO"). It is not unusual for a given MGA to include multiple tuners, each capable of tuning to an independent program (commercial television, streaming video, audio programming, graphics, etc.).

The multiple tuners permit a single MGA to concurrently receive multiple programs. Typically, the multiple tuners are utilized to enable a consumer to watch or view a single program, while recording one or more others, or to enable a picture-picture function where one video program appears as an inset window superimposed upon a separate full-screen video program.

Although MGAs usually provide multiple output ports (Coaxial Cable, Component Video, Composite Video, Digital Video Interface (DVI), High-Definition Multimedia Interface (HDMI), S-Video, etc.), all of these ports typically deliver identical content. The multiplicity of outputs enables a wide variety of devices to be mated with the MGA, but fails to provide a consumer with the ability to connect multiple devices (displays, audio systems, etc.) to the MGA and direct a different and independent program to each of the devices. The simultaneous provision of multiple, independent programs, each upon a separate device, would require the use of multiple MGAs, wherein each MGA was connected to a single dedicated device adapted to display or play one of the independent programs.

Consequently, it would be advantageous to provide for a single MGA, having multiple tuners, wherein a consumer could readily direct the output of each tuners to a separate output upon the MGA, and thereby enable the simultaneous output of multiple, independent programs, each upon a separate device.

BRIEF SUMMARY OF THE INVENTION

A system and method for dynamically routing each of multiple independent content streams from a single media gateway appliance to specific output ports. The particular content and the identity of the port or ports to which it will be routed are defined by the contents of user commands received by media gateway appliance. The disclosed technology enables a single appliance to simultaneously route independent content to particular identified displays, thereby providing independent viewing experiences to multiple users.

BRIEF DESCRIPTION OF THE DRAWINGS

The aspects, and advantages of the present invention will become better understood with regard to the following description, appended claims, and accompanying drawings in which:

DETAILED DESCRIPTION

Figure 1:
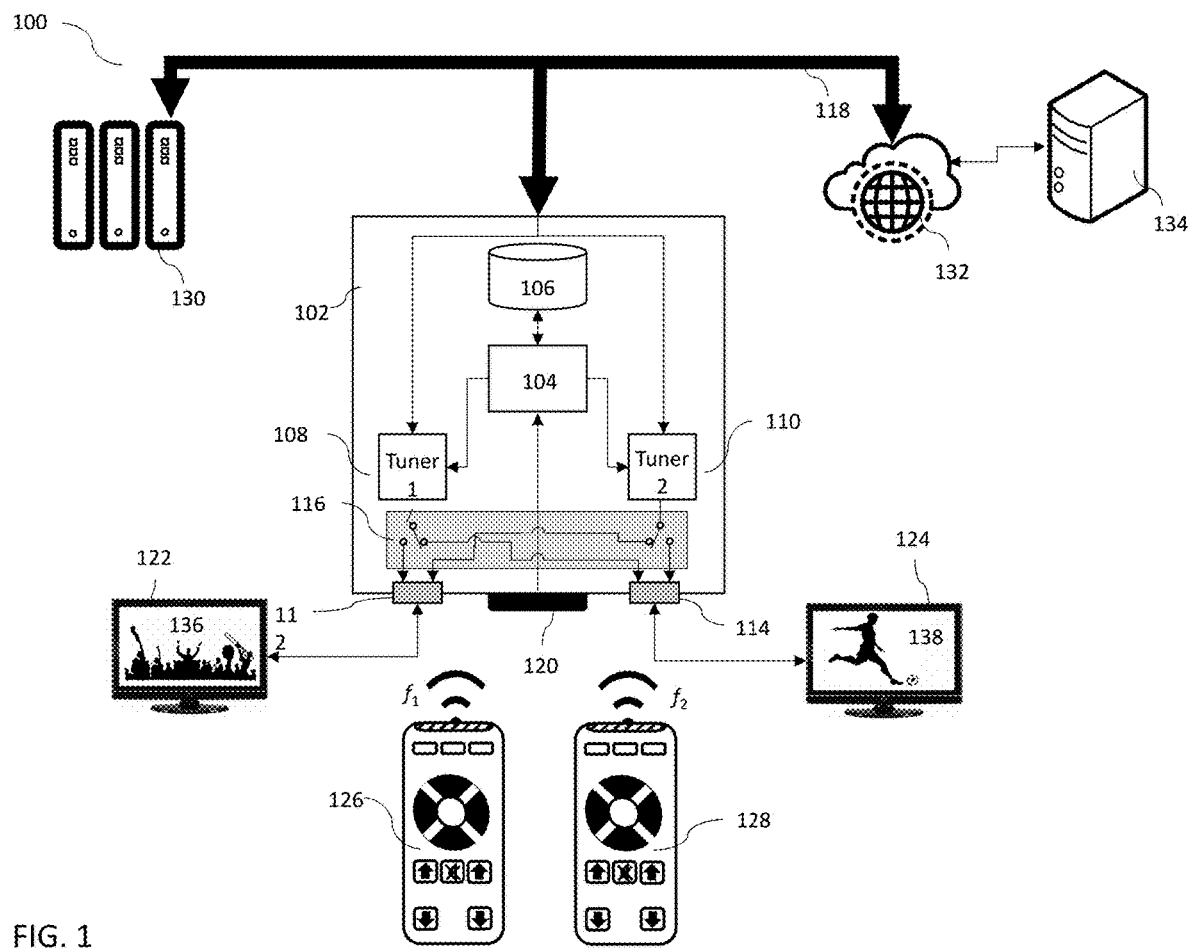
FIG. 1 is a functional block diagram of a first preferred embodiment for a system for dynamically routing each of a plurality of independent media programs to a selected output port.

FIG. 1 is a functional diagram of a first preferred embodiment of a system (100) for dynamically configuring and controlling the tuning and output of multiple independent programs in accordance with the invention. System 100 comprises MGA 102 which serves as a controller and *nexus* for the system. MGA 102 includes processor 104 and memory 106. Processor 104 is adapted to run processes that access, format and route content from tuners 108 and 110 to output ports 112 and 114 via switching fabric 116. Memory 106 stores information associating particular wireless command frequencies with a particular MGA output port and/or a particular display device. Tuners 108 and 110 are each adapted to receive via broadband link 118 a modulated content signal carrying multiple program signals, each program signal containing information defining independent content (video, audio, images, etc.). The tuners, which can be physical or virtual (software implemented), are each adapted to respond to commands instructing them to tune to and demodulate a specific one of the multiple program signals received via broadband link 118. MGA 102 also includes wireless command receiver 120, which is adapted to receive wireless commands and transmit them to processor 104 for implementation.

The system shown in FIG. 1 also includes televisions 122 (connected to receive and display content received from output 112), television 124 (connected to receive and display content received from output 114), and remote-control devices 126 and 128. Remote control device 126 is associated with television 122 and adapted to emit wireless signals (optical, radio ultrasonic) modulated on a carrier frequency $f_1$. Remote control device 128 is associated with television 124 and adapted to emit wireless signals (optical, radio ultrasonic) modulated on a carrier frequency $f_2$. In addition, MGA 102 is shown to interface with MSO headend 130 and external network 132 via broadband link 118. External network 132 also provides MGA 102 with a link to server 134.

Figure 2:
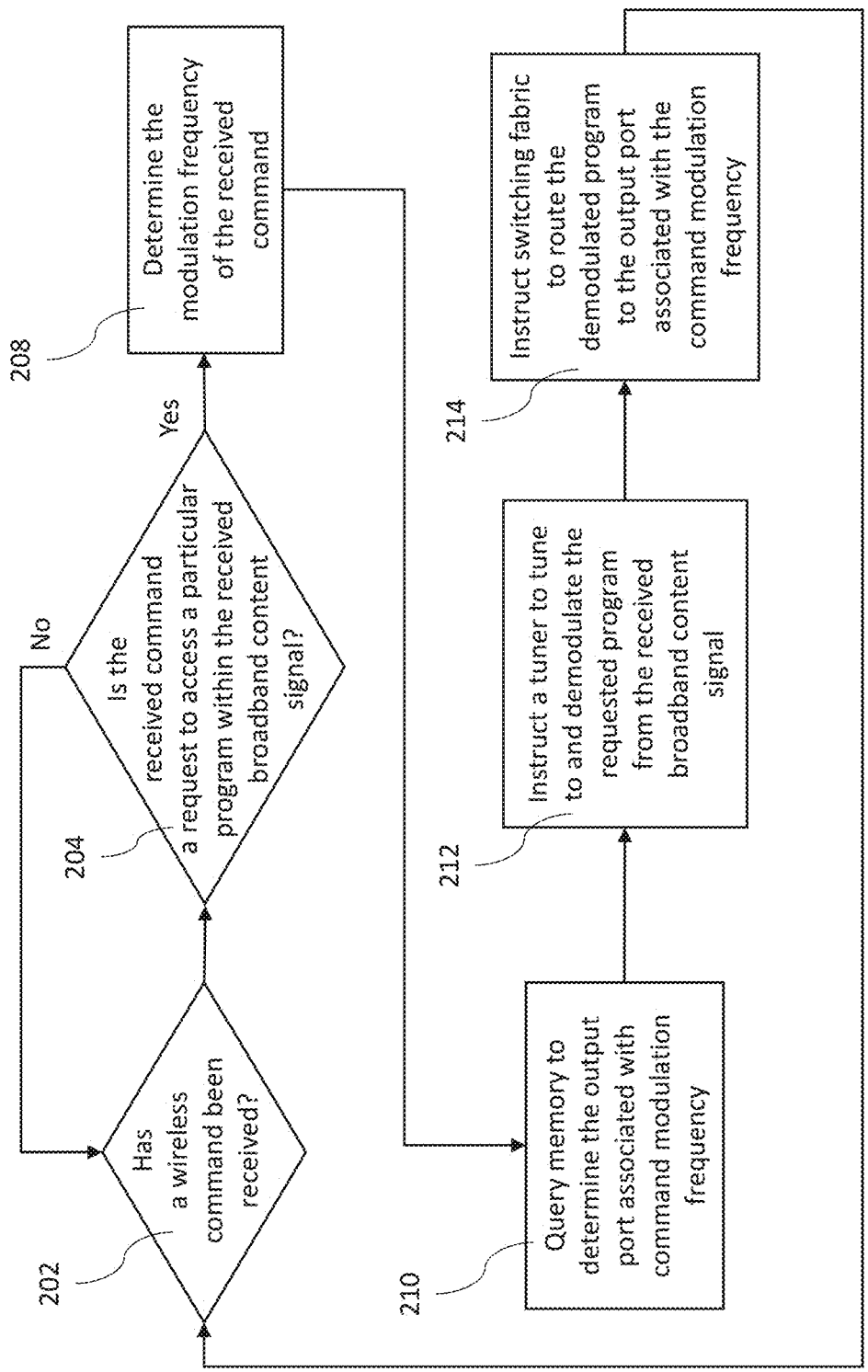
FIG. 2 is a flow diagram of a process supported within the system of FIG. 1.

A user wishing to access a specific program on television 120 would employ remote control 124 to wirelessly transmit one or more commands (modulated at frequency $f_1$) to wireless command receiver 120 upon MGA 102. Upon receipt of the wireless command, processor 102 determines if the received command is a request for accessing particular program content among the multiple program signals that comprise the signal received via broadband link 118. (steps 202 and 204 of FIG. 2). The source of the program signal could be headend 130 and/or external network 132. External network 132 can also provide MGA 102 with access to programming originating from server 134. As shown in FIG. 2, if the processor makes the determination that the received command is not a request for accessing particular program content, the process continues with step 202 and the system awaits the issuing of the next remote-control command.

However, if it is determined that the received command was indeed a request to access particular content, the process proceeds to step 208 and the processor determines the modulation frequency of the command. Processor 104 then queries memory 106 to access information that associates the detected frequency with a specific output port upon MGA 102 (step 210). Table A below provides an illustration of the type of information stored in memory 106:

TABLE A

| Remote Control Frequency | Output Port |
|---|---|
| $f_1$ | 112 |
| $f_2$ | 114 |

As shown above, frequency $f_1$, emitted by remote-control 126, is associated with output port 112. Utilizing this information, processor 104 would then instruct an available tuner within MGA 102 (in this example, tuner 108) to tune to proper band to capture and demodulate the signal carrying the requested program content (step 212). Information associating a particular channel, network or content provider with a given frequency or bandwidth within the signal carried upon broadband link 118 can also be stored within memory 106 and accessed by processor 104 as needed.

Finally, processor 104 causes switching fabric 116 to provide a connection between the output of tuner 108 and MGA output port 112 (step 214). This enables the requested program content (136) to be delivered to television 126. The process would then revert back to step 202 and await the reception of a new wireless command.

A similar process of issuing a command requesting access to particular program content could be accomplished using remote-control 128, which produces commands modulated at frequency $f_1$. The process would be very similar to that described above for remote-control 126, but it would utilize tuner 110 (tuner 108 is already in use) and direct the demodulated content to MGA output port 114. This would result in the content (138) being displayed on television 124.

Although differentiation between the wireless commands emitted by the multiple remote-control devices is described above as being accomplished by having each individual remote-control devices modulate it's emissions at a particular, exclusive frequency, this differentiation could also be enabled by embedding an identification code, exclusive to a particular remote-control device, within the signals produced by the remote-controls (such as in a header or prefix to the actual command information being transmitted). All the remote-controls could generate signals modulated at the same frequency, but the exclusive code for each individual remote-control device would be recognized by processor 104 based upon code information stored in memory 106. Memory 106 would also store information associating each exclusive identifier with a particular output port. See Table B below:

TABLE B

| Remote Control ID Code | Output Port |
|---|---|
| 0001 | 112 |
| 0010 | 114 |

It should be noted, that although wireless command receiver 120 is depicted as being integral to MGA 102, such a receiver could be a separate, stand-alone device, such as a Bluetooth® of Wi-Fi transceiver, or an infrared optical receiver. The wireless command receiver could also be integrated into a television or other device adapted for playing or viewing content. The device would then be adapted to transmit any received commands to MGA 102 for processing and implementation.

Figure 3:
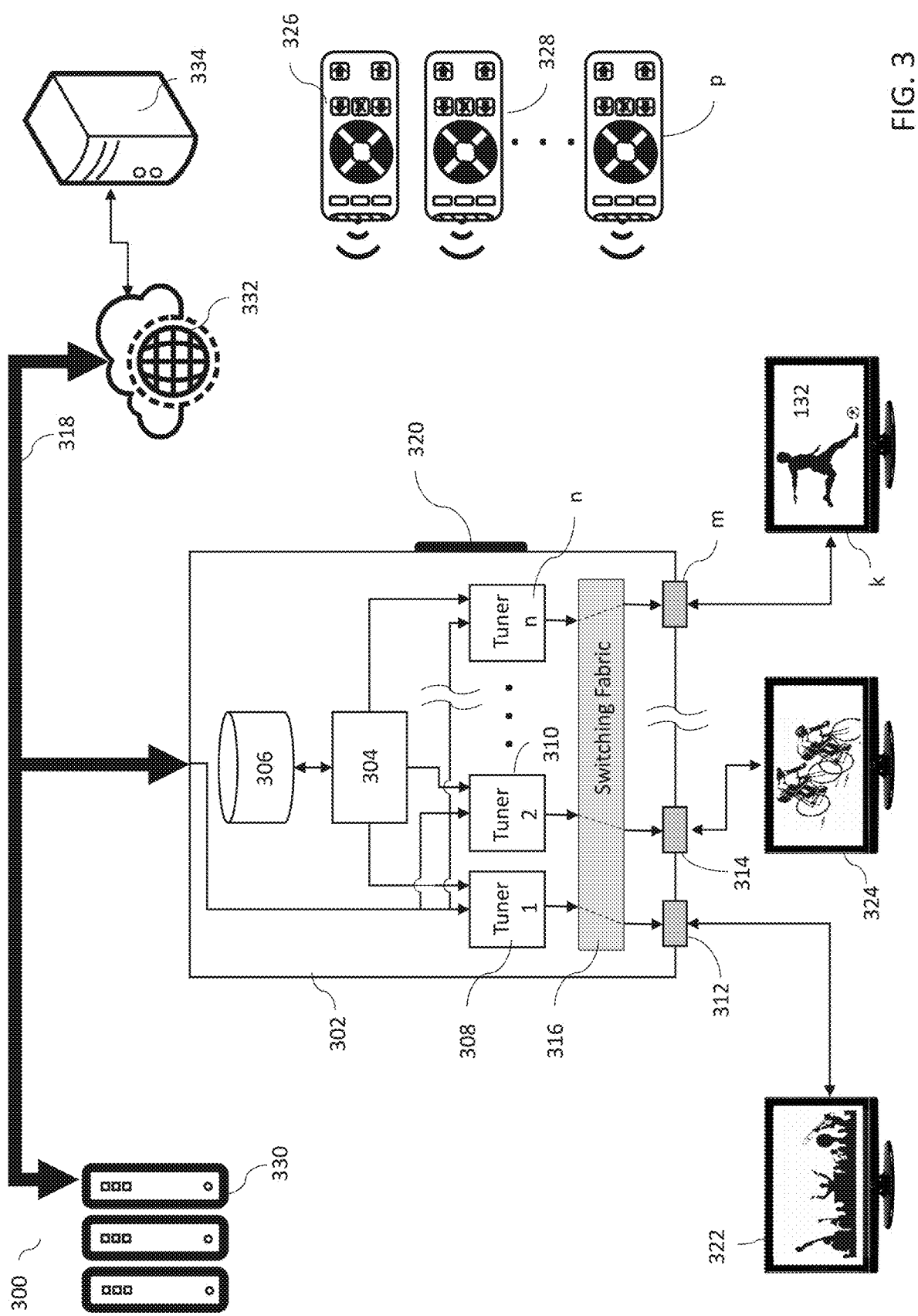
FIG. 3 is a functional block diagram of a second preferred embodiment for a system for dynamically routing each of a plurality of independent media programs to a selected output port.

The system and process described above can be readily applied to larger systems wherein an MGA (or a linked system of multiple MGAs) provides for a larger number of tuners and a larger number of output ports. A depiction of an embodiment (300) providing n tuners and m output ports is shown in FIG. 3. MGA 302 includes processor 304 and memory 306 (which function in a manner similar to previously described MGA 102, processor 104 and memory 106). MGA 302 receives a broadband signal via broadband link 318. Programming contained within that signals can originate at headend 330, or be received via external network 332 (including content provided from server 334).

As shown, MGA 302 includes tuners 308, 310 . . . n, each of which is capable of independently tuning to a particular frequency or bandwidth to capture content received via broadband link 318. MGA 302 is also shown to include output ports 312, 314 . . . m. Each of these output ports is connected to a television to permit the output content to be viewed or played (televisions 322, 324 . . . k, where k=m). Wireless remote controls 326, 328 . . . p, where p=k, are each paired with a particular television. Each of the wireless remote-controls also transmits emit wireless signals (optical, radio, ultrasonic) modulated on an exclusive carrier frequency ($f_1, f_2 \ldots f_p$) Processor 304 is adapted to utilize information stored in memory 306 to associate the frequency of each received wireless remote signal with a particular output port and instruct switching fabric 316 to direct requested content accordingly. In the embodiment of FIG. 3, this resulted in content related to a musical performance being directed to television 322, content related to a cycling being directed to television 324 and content related to a soccer match being directed to television k.

It should also be evident that in MGAs or MGA systems wherein the number of tuners is greater than the number of output ports, the processor and switching fabric could be adapted to direct the output of more than one tuner to a single output port. This could support the concurrent display of multiple tuner outputs in a picture-in-picture format, or a split screen arrangement. Formatting and blending two or more tuner outputs into a single picture-in-picture or single split screen display can be accomplished by utilizing a video compositor. Video compositors and the process of utilizing such to combine multiple video outputs into a single composite video is well known in the art.

Although the invention herein has been described with reference to particular embodiments, it is to be understood that these embodiments are merely illustrative of the principles and applications of the present invention. For example, the links between the MGA and the televisions could be wireless or wired. The devices utilized to view or play requested content could include any suitable device including televisions, tablets, computer displays, smartphones, projectors, an audio system, a smart speaker, a digital assistant, etc. The content capable of being displayed is not limited to video or graphics, but rather could be any single or multimedia content including images (still or moving) without an associated soundtrack, audio without associated visual content, both live and recorded programming, including programming stored upon a memory within or co-located with an MGA, live video conferencing, streaming media and broadcast media. The headend and external network can be network can be linked to one or more MGAs via wired and/or wireless connections. In addition, the processing described as being performed within a given MGA could also be performed at a remote server or headend linked to one or more MGAs by a broadband connection (wired or wireless). The disclosed systems could also be adapted to concurrently route the output of single tuner to a plurality of output ports in response to a received wireless command. All of the above variations and reasonable extensions therefrom could be implemented and practiced without departing from the spirit and scope of the present invention as defined by the appended claims.

The invention claimed is:

1. A system for dynamically tuning and directing received content, the system comprising:
a plurality of tuners, each tuner of the plurality of tuners being configured to receive a broadband multi-program signal, tune to a specified frequency within the bandwidth of the broadband multi-program signal in response to a received tuning command, acquire and demodulate program content, and output the demodulated program content;
a plurality of output ports, each output port connected to a respective peripheral device and configured to deliver the demodulated program content to the respective peripheral device;
a switching fabric that provides a connection between the plurality of tuners and a plurality of output ports and is configured to switchably link the demodulated program content output by each of the plurality of tuners with a selected one of the plurality of output ports;
at least one wireless command receiver configured to receive commands from a plurality of wireless control devices, wherein each command of the received commands identifies particular content to be accessed and includes a wireless controller identifier identifying a particular wireless control device from which the command is received;
at least one memory configured to store information associating each wireless controller identifier of a plurality of the wireless control device identifiers with at least one output port of the plurality of output ports; and
at least one processor configured to:
extract the identity of the content to be accessed and the wireless controller identifier from each wireless command of the wireless commands received at the at least one wireless command receiver;
associate a first wireless command received from a first wireless control device of the plurality of wireless control devices with a first output port of the plurality of output ports using at least a first wireless controller identifier of the first wireless control device extracted from a wireless command received from the first wireless control device and the information stored in the memory;
associate at least a second wireless command received from a second wireless device of the plurality of wireless control devices with a second output port of the plurality of output ports using at least a second wireless controller identifier of the second wireless control device extracted from a wireless command received from the second wireless control device and the information stored in the memory;
generate, based at least in part on the content identity extracted from the first wireless command, a first tuning command instructing a first tuner of the plurality of tuners to tune to a particular frequency and demodulate a first program content;
generate, based at least in part on the content identity extracted from the second wireless command, a second tuning command instructing a second tuner of the plurality of tuners to tune to a particular frequency and demodulate a second program content; and
route, via the switching fabric, the demodulated first program content to the first one of the plurality of output ports, and
route, via the switching fabric, the demodulated second program content to the second one of the plurality of output ports,
wherein a number of the plurality of tuners is greater than a number of the plurality of output ports and, in response to receiving at least a third wireless command from a third wireless control device, and as a result of plurality of tuners outnumbering the plurality of output ports, the processor and switching fabric are configured to direct an output of a third tuner of the plurality of tuners to a single output port of the plurality of output ports such that a peripheral device connected to the single output port displays multiple tuner outputs in a picture-in-picture format or split screen arrangement.

2. The system of claim 1 wherein the first or second program contents each comprise at least one of the following:
single media content;
multimedia content;
at least one still image;
a video;
audio;
recorded programming;
broadcast programming;
streaming content; and
a video conference.

3. The system of claim 1 wherein the at least one processor is integral to a media gateway appliance.

4. The system of claim 3 wherein the media gateway appliance comprises a set-top box.

5. The system of claim 1 wherein the identifier to each particular wireless control device comprises at least one of the following:
a particular frequency of modulation; and
a particular identification code.

6. The system of claim 5 wherein the switching fabric comprises at least one of the following:
a plurality of physical switches; and
a plurality of virtual switches.

7. The system of claim 1 wherein the peripheral device comprises at least one of the following:
a television;
a computer monitor;

a tablet;
a smartphone;
a projector;
an audio system;
a smart speaker; and
a digital assistant.

8. The system of claim 1, further comprising at least one compositor wherein
the switching fabric is further configured to:
switchably link the output from at least two of the plurality of tuners with the at least one compositor; and
switchably link the output of the at least one compositor with a selected one of the plurality of output ports;
the at least one wireless command receiver is further adapted to receive commands from a plurality of wireless control devices, wherein at least one of the received commands identifies at least two particular content sources to be accessed and comprises a wireless controller identifier to a particular wireless control device; and
at least one processor is further adapted to:
extract the identity of the at least two particular content sources to be accessed and the wireless controller identifier from at least one of the commands received at the at least one wireless command receiver;
generate a third tuning command instructing the third tuner of the plurality of tuners to tune to a particular frequency and demodulate a third program content;
generate at least a fourth tuning command instructing at least a fourth one of the plurality of tuners to tune to a particular frequency and demodulate at least a fourth program content;
route, via the switching fabric, the demodulated third and at least fourth program contents to the at least one compositor; and
route from the compositor, via the switching fabric, a single media stream representing a combination of the third and at least fourth program contents to a third output port of the plurality of output ports.

9. The system of claim 8 wherein the third and at least fourth program contents each comprise at least one of the following:
single media content;
multimedia content;
at least one still image;
a video;
audio;
recorded programming;
broadcast programming;
streaming content; and
a video conference.

10. A method for dynamically tuning and directing received content, practiced in a system comprising:
a plurality of tuners, each tuner of the plurality of tuners being configured to receive a broadband multi-program signal, tune to a specified frequency within the bandwidth of the broadband multi-program signal in response to a received tuning command, acquire and demodulate program content, and output the demodulated program content;
a plurality of output ports, each output port connected to a respective peripheral device and configured to deliver the demodulated program content to the respective peripheral device;
a switching fabric that provides a connection between the plurality of tuners and a plurality of output ports and is configured to switchably link the demodulated program content output by each of the plurality of tuners with a selected one of the plurality of output ports;
at least one wireless command receiver configured to receive commands from a plurality of wireless control devices, wherein each command of the received commands identifies particular content to be accessed and includes a wireless controller identifier to a particular wireless control device;
at least one memory configured to store information associating each wireless controller identifier of a plurality of wireless control device identifiers with at least one of the plurality of output ports; and
at least one processor;
the method comprising the steps of:
extracting the identity of the content to be accessed and the wireless controller identifier from each wireless command of the wireless commands received at the at least one wireless command receiver;
associating a first wireless command received from a first wireless control device of the plurality of wireless control devices with a first output port of the plurality of output ports using at least a first wireless controller identifier to the first wireless control device extracted from a wireless command received from the first wireless control device and the information stored in the memory;
associating at least a second wireless command received from a second wireless device of the plurality of wireless control devices with a second output port of the plurality of output ports using at least a second wireless controller identifier to the second wireless control device extracted from a wireless command received from the second wireless control device and the information stored in the memory;
generating, based at least in part on the content identity extracted from the first wireless command, a first tuning command instructing a first tuner of the plurality of tuners to tune to a particular frequency and demodulate a first program content;
generating, based at least in part on the content identity extracted from the second wireless command, a second tuning command instructing a second tuner of the plurality of tuners to tune to a particular frequency and demodulate a second program content;
routing, via the switching fabric, the demodulated first program content to the first output port of the plurality of output ports; and
routing, via the switching fabric, the demodulated second program content to the second output port of the plurality of output ports,
wherein a number of the plurality of tuners is greater than a number of the plurality of output ports,
the method further comprising:
in response to receiving at least a third wireless command from a third wireless control device, and as a result of plurality of tuners outnumbering the plurality of output ports, directing, by the processor and switching fabric, an output of a third tuner of the plurality of tuners to a single output port of the plurality of output ports such that a peripheral device connected to the single output port displays multiple tuner outputs in a picture-in-picture format or split screen arrangement.

11. The method of claim 10 wherein the first or second program contents each comprise at least one of the following:
   single media content;
   multimedia content;
   at least one still image;
   a video;
   audio;
   recorded programming;
   broadcast programming;
   streaming content; and
   a video conference.

12. The method of claim 10 wherein the at least one processor is integral to a media gateway appliance.

13. The method of claim 10 wherein the media gateway appliance comprises a set-top box.

14. The method of claim 10 wherein the identifier to each particular wireless control device comprises at least one of the following:
   a particular frequency of modulation; and
   a particular identification code.

15. The method of claim 14 wherein the switching fabric comprises at least one of the following:
   a plurality of physical switches; and
   a plurality of virtual switches.

16. The method of claim 10 wherein the peripheral device comprises at least one of the following:
   a television;
   a computer monitor;
   a tablet;
   a smartphone;
   a projector;
   an audio system;
   a smart speaker; and
   a digital assistant.

17. The method of claim 10, wherein the system further comprises:
   at least one compositor, wherein the switching fabric is further configured adapted to:
   switchably link the output from at least two of the plurality of tuners with the at least one compositor; and
   switchably link the output of the at least one compositor with a selected one of the plurality of output ports; and
   the at least one wireless command receiver is further adapted to receive commands from a plurality of wireless control devices, wherein at least one of the received commands identifies at least two particular content sources to be accessed and comprises a wireless controller identifier to a particular wireless control device; and
   and the method further comprises the steps of:
   extracting the identity of the at least two particular content sources to be accessed and the wireless controller identifier from at least one of the commands received at the at least one wireless command receiver;
   generating a third tuning command instructing the third tuner of the plurality of tuners to tune to a particular frequency and demodulate a third program content;
   generating at least a fourth tuning command instructing at least a fourth tuner of the plurality of tuners to tune to a particular frequency and demodulate at least a fourth program content;
   routing, via the switching fabric, the demodulated third and at least fourth program contents to the at least one compositor; and
   routing from the compositor, via the switching fabric, a single media stream representing a combination of the third and at least fourth program contents to the third output port of the plurality of output ports.

18. The method of claim 17 wherein the third and at least fourth program contents each comprise at least one of the following:
   single media content;
   multimedia content;
   at least one still image;
   a video;
   audio;
   recorded programming;
   broadcast programming;
   streaming content; and
   a video conference.

* * * * *